(12) United States Patent
Hungerford

(10) Patent No.: US 10,728,293 B2
(45) Date of Patent: *Jul. 28, 2020

(54) COMMUNICATING MEDIA DATA

(71) Applicant: Microsoft Technology Licensing, LLC, Redmond, WA (US)

(72) Inventor: Matthew Hungerford, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 36 days.

This patent is subject to a terminal disclaimer.

(21) Appl. No.: 16/109,319

(22) Filed: Aug. 22, 2018

(65) Prior Publication Data

US 2019/0007470 A1  Jan. 3, 2019

Related U.S. Application Data

(63) Continuation of application No. 13/555,431, filed on Jul. 23, 2012, now Pat. No. 10,079,864.

(Continued)

(51) Int. Cl.
*H04L 29/06* (2006.01)

(52) U.S. Cl.
CPC .......... *H04L 65/4007* (2013.01); *H04L 63/08* (2013.01); *H04L 63/18* (2013.01); *H04L 65/1069* (2013.01); *H04L 65/602* (2013.01)

(58) Field of Classification Search
CPC ....... H04L 63/08; H04L 29/06; H04L 63/102; H04L 67/306; H04L 63/10; H04L 67/02; H04L 29/08072; H04L 63/0853; H04L 63/0861; H04L 65/403; H04L 67/18; H04L 69/329; H04L 51/32; H04L 65/1069; H04L 51/20; H04L 51/38; H04L 63/0815; H04L 63/0884; H04L 67/10; H04L 67/1097; H04L 67/141; H04L 61/308; H04L 63/105; H04L 67/16; H04L 67/20; H04L 67/22;

(Continued)

(56) References Cited

U.S. PATENT DOCUMENTS

| 2006/0294367 A1* | 12/2006 | Yoshioka | H04L 63/0823 713/156 |
| 2007/0056021 A1* | 3/2007 | Annic | H04L 63/0281 726/4 |
| 2010/0246827 A1* | 9/2010 | Lauter | G06F 21/6209 380/278 |

* cited by examiner

*Primary Examiner* — Djenane M Bayard

(74) *Attorney, Agent, or Firm* — Schwegman Lundberg & Woessner, P.A.

(57) ABSTRACT

Communicating media data over a communication system in which a first communication instance for a user of the communication system is implemented at a first user terminal, and a second communication instance for the user of the communication system is implemented at a second user terminal. The user is simultaneously logged into the communication system via: (i) the first communication instance at the first user terminal, and (ii) the second communication instance at the second user terminal. A media communication session is established between the first and second communication instances, wherein the media communication session is authenticated on the basis of the same user being simultaneously logged into the communication system via both the first and second communication instances. Media data is communicated in the media communication session from the first communication instance at the first user terminal to the second communication instance at the second user terminal.

20 Claims, 8 Drawing Sheets

Related U.S. Application Data

(60) Provisional application No. 61/583,695, filed on Jan. 6, 2012.

(58) Field of Classification Search
CPC ... H04L 67/34; H04L 2463/082; H04L 43/08; H04L 43/0894; H04L 51/046; H04L 51/16; H04L 63/0428; H04L 63/083; H04L 63/107; H04L 9/3231; H04L 9/3247; H04L 63/0876; H04L 9/0822; H04L 9/0894; H04L 9/3297; H04L 2463/102; H04L 63/0435; H04L 2209/805; H04L 63/0492; H04L 63/20; H04L 67/1095; H04L 9/0819; H04L 9/0841; H04L 9/14; H04L 2209/56; H04L 51/10; H04L 61/10; H04L 63/205; H04L 63/068; H04L 63/126; H04L 63/1425; H04L 9/006; H04L 9/0631; H04L 9/0825; H04L 9/0861; H04L 9/30; H04L 9/3263; H04L 2209/88; H04L 29/00
See application file for complete search history.

COMMUNICATING MEDIA DATA

RELATED APPLICATION

This application is a continuation application of U.S. patent application Ser. No. 13/555,431, filed Jul. 23, 2012, which application claims priority under 35 USC 119 to U.S. Patent Application Ser. No. 61/583,695 filed Jan. 6, 2012, the disclosures of which are incorporated herein in their entireties.

TECHNICAL FIELD

The present invention relates to communicating media data. In particular the present invention relates to communicating media data between user terminals.

BACKGROUND

A user often has many different user terminals with which he can interact. For example a user may have user terminals such as a mobile phone, a laptop, a tablet, a television, a set top box, a set of speakers and/or a digital picture frame. The user may also have media data which he stores at one or more of the user terminals and which can be output by one or more of the user terminals. Media data may include, for example, image data, audio data such as music data, video data and/or text data. For example, media data stored at the user's mobile phone may be output from the mobile phone. However, a problem can occur when a user wishes to output some piece of media data from a user terminal at which the media data is not stored. For example, the user may wish to output a piece of media data, which is stored at a mobile phone, from a television. This may be the case because the television may have higher quality output means (such as a large screen and high quality speakers) than those of the mobile phone at which the media data is stored.

One solution to the problem mentioned above is to connect a user's user terminals together using a local connection, which may for example be a wired connection such as via a USB interface or a wireless connection such as an infra-red or Bluetooth connection. The media data may be transferred between user terminals by performing a "file transfer". Such local connections require the user to establish the connection (which may take some time and/or skill on the user's behalf) and also require the user terminals to be located in close proximity in order to establish the local connection. This can be restrictive and may prevent the user from attempting to output media data from a user terminal other than the one at which the media data is stored.

SUMMARY

According to a first aspect of the invention there is provided a method of communicating media data over a communication system, the method comprising: implementing, at a first user terminal, a first communication instance for a user of the communication system; implementing, at a second user terminal, a second communication instance for the user of the communication system, wherein the user is simultaneously logged into the communication system via: (i) the first communication instance at the first user terminal, and (ii) the second communication instance at the second user terminal; establishing a media communication session over said communication system between the first and second communication instances, wherein the media communication session is authenticated on the basis of the same user being simultaneously logged into the communication system via both the first and second communication instances; and communicating media data in the media communication session over the communication system from the first communication instance at the first user terminal to the second communication instance at the second user terminal.

Communication systems allow data to be sent between user terminals of the communication system. The inventors have realized that many of the user's user terminals may be connected to the communication system, and that this connection with the communication system may be utilized to establish a media communication session for communicating media data from one of the user's user terminals to another of the user's user terminals. For example, the user terminals (e.g. a mobile phone and a television) may be connected to the communication system over the Internet, and a media communication session can be established over the already existing connections to the Internet. This removes the time and/or skill required on the user's behalf to set up a local connection between the user terminals in order to transfer media data between user terminals of the user. This is achieved by authenticating the media communication session on the basis that the same user is logged into the communication system at both of the user terminals. There is therefore provided a simple method of communicating data between user terminals of the user when the user terminals are able to connect to the communication system thereby allowing the user to log into the communication system at both the first and second user terminals simultaneously.

The method may further comprise: establishing a media sharing session over said communication system between the second communication instance at the second user terminal and another user terminal associated with another user; and communicating the media data received at the second user terminal in the media communication session to the other user terminal in the media sharing session.

The user may be identified in the communication system by a user ID and the media communication session may be authenticated by checking that the user ID of the user logged into the communication system via the first communication instance matches the user ID of the user logged into the communication system via the second communication instance.

The method may further comprise the first user terminal querying the second user terminal to determine whether the second user terminal supports media communication sessions. If it is determined that the second user terminal supports media communication sessions then the method may further comprise enabling an option in a user interface at the first user terminal thereby allowing the first user to initiate the media communication session. In response to said querying the second user terminal, the second user terminal may provide an indication to the first user terminal of second user terminal requirements for outputting media in the media communication session. The method may further comprise the first user terminal processing the media data prior to communication of the media data to the second user terminal in the media communication session, wherein the media data may be processed to suit said second user terminal requirements. The second user terminal requirements may comprise at least one of: (i) a resolution of an image of said media data, (ii) a file type of said media data, and (iii) memory requirements of the second user terminal for said media data. The processing of the media data may comprise resizing the media data.

Communication between the first and second user terminals in the media communication session may comprise communicating a stream of data blocks having a media communication protocol.

The method may further comprise outputting the communicated media data at the second user terminal automatically when it is received from the first user terminal in the media communication session.

The communicated media data may be stored temporarily at the second user terminal. It may be the case that none of the media data communicated to the second user terminal in the media communication session is stored at the second user terminal after the media communication session has ended. In one example, the communicated media data comprises a plurality of files and no more than one of the files is stored at the second user terminal in the media communication session at a time. The communicated media data may be stored in a data store at the second user terminal which is dedicated for storing data of the media communication session and which is distinct from the main memory of the second user terminal.

The media data may comprise at least one of image data, music data, video data, audio data and text data. For example, the media data may comprise image data in the JPEG format.

The first user terminal may be a portable device and the second user terminal may be a non-portable device. For example, the first user terminal may be one of a laptop, a mobile phone and a tablet; and the second user terminal may be one of a television, a blue-ray player, a set top box, a games console, a speaker and a digital picture frame.

According to a second aspect of the invention there is provided a communication system comprising: a first user terminal configured to implement a first communication instance for a user of the communication system; and a second user terminal configured to implement a second communication instance for the user of the communication system, wherein the communication system is configured to simultaneously log the user into the communication system via: (i) the first communication instance at the first user terminal, and (ii) the second communication instance at the second user terminal, wherein the first user terminal is configured to establish a media communication session over said communication system between the first and second communication instances, wherein the media communication session is authenticated on the basis of the same user being simultaneously logged into the communication system via both the first and second communication instances, and wherein the first user terminal is further configured to communicate media data in the media communication session over the communication system from the first communication instance at the first user terminal to the second communication instance at the second user terminal.

According to a third aspect of the invention there is provided a user terminal configured to: implement a communication instance for a user of the communication system, wherein a further communication instance is implemented for the user of the communication system at a further user terminal, and wherein the communication system is configured to simultaneously log the user into the communication system via: (i) the communication instance at the user terminal, and (ii) the further communication instance at the further user terminal; establish a media communication session over said communication system between said communication instance and the further communication instance, wherein the media communication session is authenticated on the basis of the same user being simultaneously logged into the communication system via both said communication instance and the further communication instance; and communicate media data in the media communication session over the communication system from the communication instance at the user terminal to the further communication instance at the further user terminal. The user terminal may be further configured to process the media data prior to communication of the media data to the further user terminal in the media communication session, wherein the media data may be processed to suit requirements of the further user terminal for outputting media in the media communication session. The user terminal may be a portable device, such as a laptop, a mobile phone or a tablet.

According to a fourth aspect of the invention there is provided a computer program product for communicating media data over a communication system, the computer program product being embodied on a non-transient computer-readable medium and configured so as when executed on a processor of a user terminal to perform the operations of: implementing a communication instance for a user of the communication system, wherein a further communication instance for the user of the communication system is implemented at a further user terminal, and wherein the communication system is configured to simultaneously log the user into the communication system via: (i) the communication instance at the user terminal, and (ii) the further communication instance at the further user terminal; establishing a media communication session over said communication system between said communication instance and the further communication instance, wherein the media communication session is authenticated on the basis of the same user being simultaneously logged into the communication system via both said communication instance and the further communication instance; and communicating media data in the media communication session over the communication system from the communication instance at the user terminal to the further communication instance at the further user terminal.

According to a fifth aspect of the invention there is provided a user terminal configured to: implement a communication instance for a user of the communication system, wherein a further communication instance is implemented for the user of the communication system at a further user terminal, and wherein the communication system is configured to simultaneously log the user into the communication system via: (i) the communication instance at the user terminal, and (ii) the further communication instance at the further user terminal; establish a media communication session over said communication system between said communication instance and the further communication instance, wherein the media communication session is authenticated on the basis of the same user being simultaneously logged into the communication system via both said communication instance and the further communication instance; and receive media data in the media communication session over the communication system at the communication instance at the user terminal from the further communication instance at the further user terminal. The user terminal may be a non-portable device, such as a television, a blue-ray player, a set top box, a games console, a speaker or a digital picture frame.

According to a sixth aspect of the invention there is provided a computer program product for communicating media data over a communication system, the computer program product being embodied on a non-transient computer-readable medium and configured so as when executed on a processor of a user terminal to perform the operations of: implementing a communication instance for a user of the communication system, wherein a further communication instance for the user of the communication system is implemented at a further user terminal, and wherein the communication system is configured to simultaneously log the user into the communication system via: (i) the communication instance at the user terminal, and (ii) the further communication instance at the further user terminal; establishing a media communication session over said communication system between said communication instance and the further communication instance, wherein the media communication session is authenticated on the basis of the same user being simultaneously logged into the communication system via both said communication instance and the further communication instance; and receiving media data in the media communication session over the communication system at the communication instance at the user terminal from the further communication instance at the further user terminal.

BRIEF DESCRIPTION OF THE DRAWINGS

For a better understanding of the various embodiments and to show how the same may be put into effect, reference will now be made, by way of example, to the following drawings in which.

DETAILED DESCRIPTION

Figure 1:
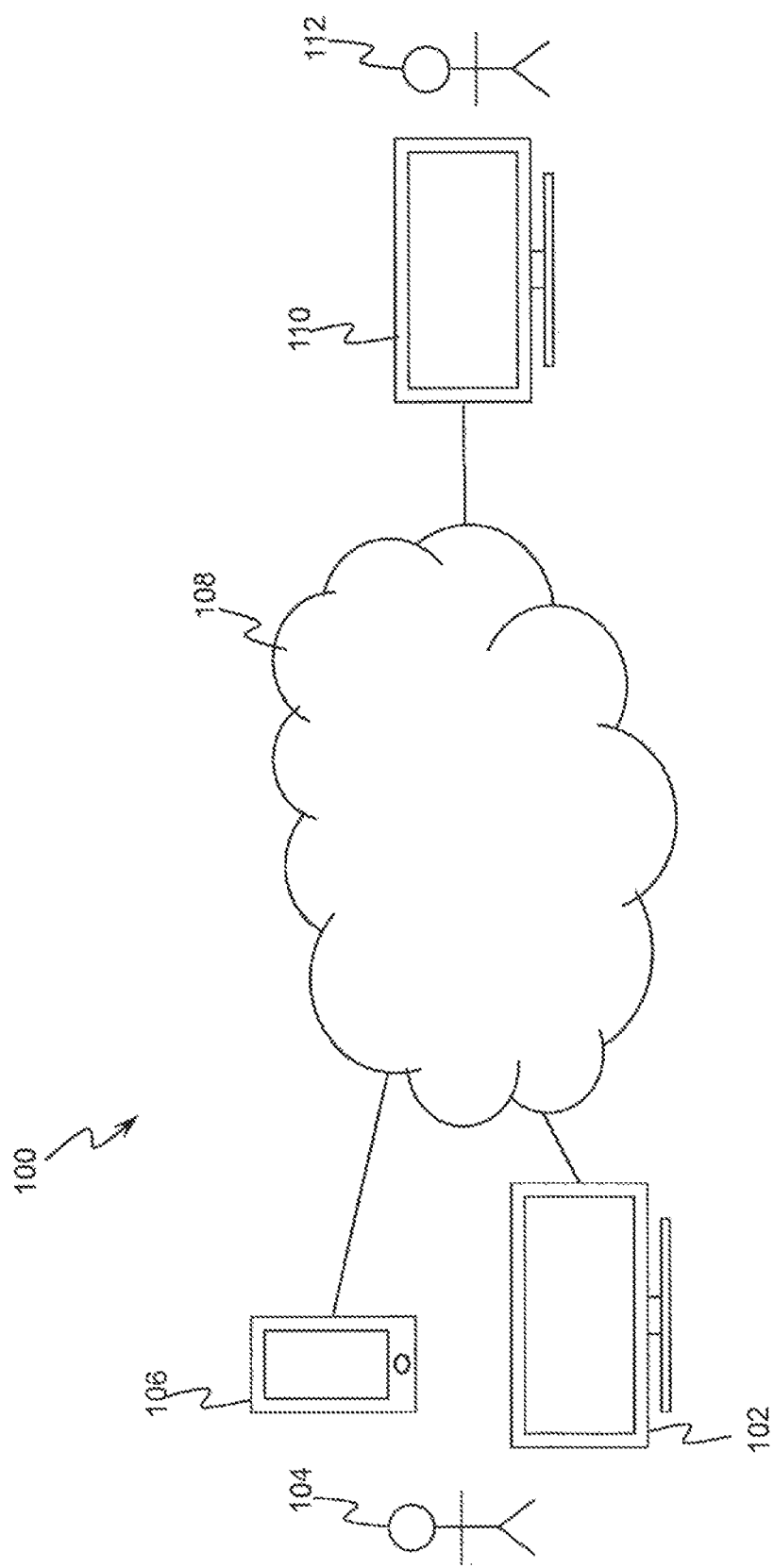
FIG. 1 shows a communication system according to an embodiment.

FIG. 1 shows a communication system 100 comprising a first user 104 who is associated with a first user terminal 102 and also with a further user terminal 106, and a second user 112 who is associated with a second user terminal 110. In other embodiments the communication system 100 may comprise any number of users and associated user terminals. The user terminals 102 and 110 can communicate over the network 108 in the communication system 100, thereby allowing the users 104 and 112 to communicate with each other over the network 108. In one embodiment the communication system 100 is a packet-based, P2P communication system, but other types of communication system could also be used, such as non-P2P, VoIP or IM systems. The network 108 may, for example, be the Internet or another type of network such as a telephone network (such as the PSTN or a mobile telephone network). The user terminal 102 may be, for example, a mobile phone, a television, a personal digital assistant ("PDA"), a personal computer ("PC") (including, for example, Windows™, Mac OS™, and Linux™ PCs), a gaming device or other embedded device able to connect to the network 108. The user terminal 102 is arranged to receive information from and output information to the user 104 of the user terminal 102. In the example shown in FIG. 1, the user terminal 102 is a television. In an embodiment, the user terminal 102 comprises a display such as a screen and an input device such as a keypad (which may for example be situated on a remote control associated with the user terminal 102), a touch-screen, and/or a microphone. The user terminal 102 is connected to the network 108.

The user terminal 102 executes a communication client, provided by a software provider associated with the communication system 100. The communication client is a software program executed on a local processor in the user terminal 102. The client performs the processing required at the user terminal 102 in order for the user terminal 102 to transmit and receive data over the communication system 100. As is known in the art, the client executed at the user terminal 102 may be authenticated to communicate over the communication system through the presentation of digital certificates (e.g. to prove that user 104 is a genuine subscriber of the communication system—described in more detail in WO 2005/009019).

The user terminals 110 and 106 may correspond to the user terminal 102. In the example shown in FIG. 1 the user terminal 110 is a television and the user terminal 106 is a mobile phone. The user terminal 110 executes, on a local processor, a communication client which corresponds to the communication client executed at the user terminal 102. The client at the user terminal 110 performs the processing required to allow the user 112 to communicate over the network 108 in the same way that the client at the user terminal 102 performs the processing required to allow the user 104 to communicate over the network 108. The user terminal 106 executes, on a local processor, a communication client which may correspond to the communication client executed at the user terminal 102. The client at the user terminal 106 performs the processing required to allow the user 104 to communicate over the network 108 in the same way that the client at the user terminal 102 performs the processing required to allow the user 104 to communicate over the network 108. The user terminals 102, 106 and 110 are end points in the communication system. FIG. 1 shows only two users (104 and 112) and three user terminals (102, 106 and 110) for clarity, but many more users and user terminals may be included in the communication system 100, and may communicate over the communication system 100 using respective communication clients executed on the respective user terminals, as is known in the art.

Figure 2:
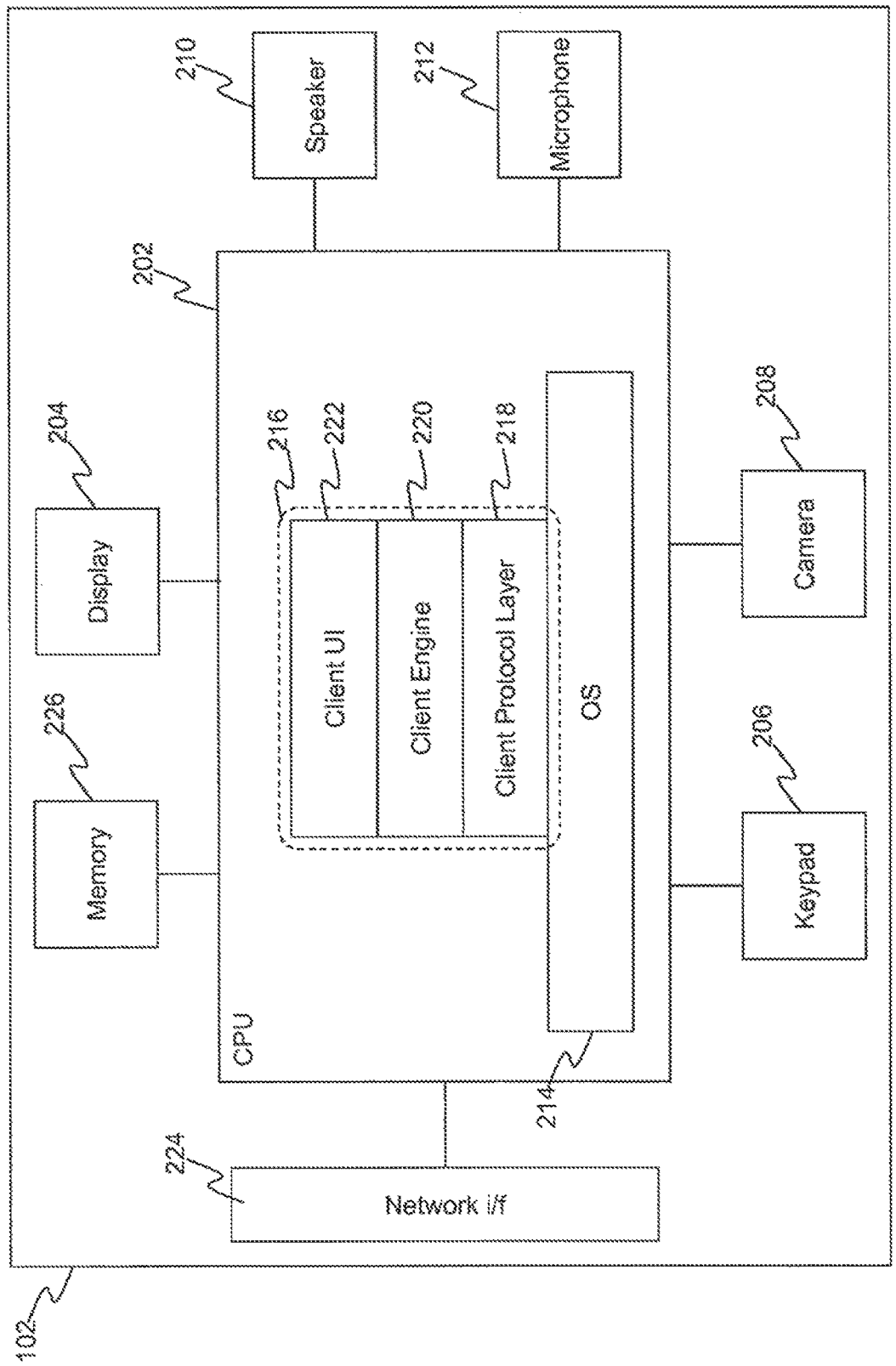
FIG. 2 shows a schematic view of a user terminal according to an embodiment.

FIG. 2 illustrates a detailed view of the user terminal 102 on which is executed a communication client for communicating over the communication system 100. The user terminal 102 comprises a central processing unit ("CPU") 202, to which is connected a display 204 such as a screen, input devices such as a keypad 206 and a camera 208. The display 204 may comprise a touch screen for inputting data to the CPU 202. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 102 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. For example, the keypad 206 may be part of a remote control associated with the user terminal 102 and which may communicate with the user terminal 102 via a wireless connection such as an infra-red or Bluetooth connection, such that the key pad is not integrated into the user terminal 102. The CPU 202 is connected to a network interface 224 such as a modem for communication with the network 108. The network interface 224 may be integrated into the user terminal 102 as shown in FIG. 2. In alternative user terminals the network interface 224 is not integrated into the user terminal 102. The user terminal 102 also comprises a memory 226 for storing data as is known in the art.

FIG. 2 also illustrates an operating system ("OS") 214 executed on the CPU 202. Running on top of the OS 214 is a software stack 216 for the client software of the communication system 100. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 224. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 104 via the user interface of the client and to receive information from the user 104 via the user interface.

The user terminals 106 and 110 are implemented in the same way as user terminal 102 as described above, wherein the user terminals 106 and 110 may have corresponding elements to those described herein in relation to user terminal 102.

FIG. 2 also illustrates an operating system ("OS") 214 executed on the CPU 202. Running on top of the OS 214 is a software stack 216 for the client software of the communication system 100. The software stack shows a client protocol layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network via the network interface 224. The client protocol layer 218 of the client software communicates with the operating system 214 and manages the connections over the communication system. Processes requiring higher level processing are passed to the client engine layer 220. The client engine 220 also communicates with the client user interface layer 222. The client engine 220 may be arranged to control the client user interface layer 222 to present information to the user 104 via the user interface of the client and to receive information from the user 104 via the user interface.

The call of step S302 may be initiated by either the user 104 or the user 110. During the call the users 104 and 110 communicate in real-time by sending and receiving data streams containing data relating to the call. For example the data relating to the call may include encoded audio or video data to be output at the far end of the call. The data stream is set up and implemented according to a communication protocol which is known to the client software executed at both the user terminals 102 and 110, such that the call data can be correctly transmitted and received during the call.

In step S304, which is performed whilst the call is implemented, a separate media sharing session is established over the communication system 100 between the user terminals 102 and 110. Before the media sharing session can be established, the user terminal 102 first checks whether the user terminal 110 supports the media sharing session. This can be implemented by sending a query from the user terminal 102 to the user terminal 110 to query the media sharing capabilities of the user terminal 110. If the user terminal 110 does support media sharing sessions then a reply to the query is sent from the user terminal 110 to the user terminal 102. In response to receiving the reply at the user terminal 102, a media sharing option (e.g. a button or feature) is enabled on the user interface of the client executed at the user terminal 102. For example a button may be displayed in the user interface of the user terminal 102 during the call, either as an always visible button or as part of a menu system in the user interface of the user terminal 102, similar to how a mute button may be displayed in the user interface for muting the call. To establish the media sharing session, the user 104 selects the media sharing option on the user interface of the client executed at the user terminal 102. For example, the user 104 may press or click on a button on the user terminal 102, e.g. using a touch screen of the display 204 of the user terminal 102, or for example pressing a dedicated button on a remote control which is linked to the user terminal 102 which may itself be, for example, a set top box. Data relating to the media sharing session is communicated using a media sharing protocol which is different from the protocol used for communicating call data relating to the call implemented in step S302. In this way, if the user terminal 110 does not support the media sharing session and does not recognize the media sharing protocol then the user terminal 110 will not reply to the query sent from the user terminal 102 relating to the ability of the user terminal 110 to support media sharing sessions. If the user terminal 102 does not receive a reply to the query within a predetermined time period after sending the query (e.g. within one second from sending the query) then the user terminal 102 may determine that the user terminal 110 does not support media sharing sessions, in which case the media sharing option is not enabled in the user interface of the client executed at the user terminal 102. Therefore, the user 104 is only able to initiate the media sharing session when the user terminal 110 is capable of supporting media sharing sessions. Even if the media sharing session is not supported at the user terminal 110, visibility of the media sharing feature may be provided by displaying the button for initiating a media sharing session in the user interface of the user terminal 102 as described above, but the button should be inhibited, that is, deactivated in some way so that the user 104 cannot select the button.

The media sharing session is authenticated on the basis of the call that is being implemented between the user terminals 102 and 110 when the media sharing session is established. That is, because the call is implemented between the user terminals 102 and 110, there is no need to perform a separate authentication checking procedure (similar to the procedure performed to authenticate the call) to determine that the media sharing session is authenticated.

When the user 104 selects the media sharing option from the user interface of the user terminal 102 to initiate the media sharing session, a request for the media sharing session is sent to the user terminal 110. In response to receiving the request at the user terminal 110, the request for the media sharing session will be displayed in the user interface of the user terminal 110 (similar to how a request for accepting the call would be displayed in the user interface of the user terminal 110). The user 112 can then either accept or decline the media sharing session. While the user terminal 102 is waiting for a response to the request, an indication is provided in the user interface of the user terminal 102 to indicate to the user 104 that the user terminal 102 is waiting for a response to the request. If the user 112 declines the media sharing session this is indicated in the user interface of the user terminal 102. If the user 112 accepts the media sharing session then the media sharing session is established. Therefore, in order to establish the media sharing session the user 104 selects the option in the user interface of the user terminal 102 for establishing the media sharing session, the user 112 accepts the media sharing session and the user terminals 102 and 110 run a user interface for the media sharing session. The user interface for the media sharing session may be included in a section of a user interface used for the call. For example, when the call is a video call, a layout in the user interface of the video call may include a dedicated section for displaying images received from the user terminal 102 in the media sharing session. This dedicated section of the user interface may be established in response to the establishment of the media sharing session.

The query to determine whether the user terminal 110 supports the media sharing session which is sent from the user terminal 102 to the user terminal 110 may be sent responsive to the initiation of the call which is implemented in step S302. In this way whenever the user terminal 102 implements a call the option for establishing a media sharing session with the other user(s) of the call will be presented to the user 104 in the user interface of the user terminal 102 dependent upon whether the other user(s) of the call support the media sharing sessions.

The query to determine whether the user terminal 110 supports the media sharing session which is sent from the user terminal 102 to the user terminal 110 may be sent at times other than being responsive to the initiation of a call between the user terminals 102 and 110. The user terminal 110 should respond to such queries even if the query is received from a user terminal with which the user terminal 110 is not currently implementing a call.

Once the media sharing session has been established, then in step S306 media data is communicated from the user terminal 102 to the user terminal 110 in the media sharing session. The media data is communicated according to the media sharing protocol of the media sharing session. The communicated media data is output to the user 112 via the user interface of the user terminal 110. For example, where the media data comprises images, the images are displayed to the user 112 on the display of the user terminal 110. The communicated media data may be output automatically at the user terminal 110 when it is received from the user terminal 102 in the media sharing session.

The call and the media sharing session proceed simultaneously with separate data streams being transmitted between the user terminals 102 and 110 for: (i) the call data according to the protocol of the call, and (ii) the media data according to the protocol of the media sharing session.

The media data may be transmitted from the user terminal 102 to the user terminal 110 in the media sharing session in data packets over the network 108. The data packets are formed according to the protocol of the media sharing session. Each data packet may include a portion of media data wherein the user terminal 110 receives multiple data packets and combines the data from those data packets in order to output the media to the user 112 at the user terminal 110 in the media sharing session. For example, each data packet may comprise a set amount of data, e.g. 16 KB or 64 KB. In one example, the raw data is Base64 encoded. The data transfer size of the data packets may be included as a prefix to the data itself in the data packet. The data transfer size shall be that of the post-Base64 converted data, not the original data itself. Preferably, the media data of the media sharing session is communicated using application-to-application (app2app) streams, which is a more reliable communication method than sending the data using datagrams. Datagrams are used to send data in distinct blocks of data which do not require the receipt of data to be acknowledged. This is in contrast to sending a data stream in which data is sent continuously over the stream and the receipt of data is guaranteed. This makes sending a data stream more reliable than sending datagrams.

Some of the messaging between the user terminals 102 and 110, (e.g. which is used to signal the start and end of the media sharing session and is used to send queries and replies regarding the ability of the user terminal 110 to support the media sharing sessions, etc.) may be sent in packets which have a different amount of data compared to the data packets. These packets can be much smaller than the data packets and may, for example, have 64 bytes. These packets also adhere to the protocol of the media sharing session.

During the media sharing session the user interface at the user terminal 102 provides the ability for the user 104 to browse media data, such as photos (which may be stored in the memory 226 of the user terminal 102), and on demand, send some or all of the media data to the user terminal 110 in the media sharing session whilst a video (or audio) call between the two user terminals 102 and 110 proceeds, provided the user terminal 110 supports the media sharing sessions.

The user terminal 102 is the host of the media sharing session and the user terminal 110 is the client of the media sharing session in the example described above. The user terminal 102 is in charge of the media sharing session and can control which pieces of media data are communicated to the user terminal 110 during the media sharing session. In contrast, the user terminal 110 outputs the media data (e.g. it displays photos) that are communicated as and when they are received from the user terminal 102 in the media sharing session. In particular, the user terminal 110 may not be able to control which pieces of media data (e.g. photos) are viewed during the media sharing session.

Some minor restrictions may be placed on implementations of the media sharing sessions, for interoperability as well as for data security and user privacy. For example in one or more embodiments, media data transferred to the user terminal 110 in the media sharing session shall not be stored to disk (i.e. memory) at the second user terminal 110. The media sharing sessions allow for a shared output of media data (e.g. a shared viewing of an image) between users over the communication system 100, whilst keeping the options available to the user terminal 110 (i.e. the client of the media sharing session) simple. Furthermore, the user terminal 102 (i.e. the host of the media sharing session) may control the output of the media data at the user terminal 110, and can control it such that only one piece of media data (e.g. one file of the media data) at a time may be output at the user terminal 110, wherein the user terminal 102 controls which piece of media data is viewed at the user terminal 110 in the media sharing session. By not storing the media data which is communicated in the media sharing session at the user terminal 110 the overhead on implementations can be reduced in terms of storage and memory at the user terminal 110. Since the media data which is communicated in the media sharing session is not permanently stored at the user terminal 110 (e.g. none of the media data may be stored at the user terminal 110 after the media sharing session ends), the user terminal 102 is not required to distribute the full files of media data (e.g. photo files) to the user terminal 110 in order to display the media data to the user 112. As described above, the communicated media data may comprise a plurality of files and in some embodiments no more than one of the files is stored at the user terminal 110 in the media sharing session at a time. For example, when one of the files is stored at the user terminal 110 in the media sharing session, then the receipt of the next file in the media sharing session causes the file currently stored at the user terminal 110 to be deleted from the user terminal 110 so that the newly received file can be stored at the user terminal 110 without storing more than one of the files at a time at the user terminal 110 in the media sharing session. Furthermore, the communicated media data may be stored in a data store at the user terminal 110 which is dedicated for storing data of the media sharing session and which is distinct from the main memory of the user terminal 110.

In order to select media data files to transfer to the user terminal 110 in the media sharing session, the user 104 may upload the files of media data, at the user terminal 102, via a file tree structure or via a graphical browsing scheme. One or more of the media data files may be selected by the user 104 and the selected media data files may then be displayed in a film strip view at the user terminal 102. The film strip can be scrolled (left, right or up, down). The user 104 can then select one or more of the media data files (e.g. photos), for example by clicking on the media data file from the film strip, and the selected media data file(s) can then be transmitted to the user terminal 110 in the media sharing session.

The host of the media sharing session, i.e. user terminal 102, is a "smart" host in the sense that it has the ability to convert the format of the media data to suit the media sharing session. For example, the format of the media data may be converted to suit capabilities of the client of the media sharing session client (user terminal 110). The conversion of the media data may comprise down-scaling and/or compression such that the size of the media data (e.g. the number of bits of the media data) is reduced (e.g. by reducing the resolution of an image) to suit the requirements of the user terminal 110. As an example, when the media data is photo data the user terminal 102 provides support for multiple image formats (e.g. jpeg, bitmap, png, . . . ) and the ability to convert an image to a format that is supported by the user terminal 110. In one simple example, all photo data is converted to the JPEG format before sending the photo data to the user terminal 110 in the media sharing session. As described above, when the media sharing session is established the user terminal 102 sends a query to the user terminal 110 to determine whether the user terminal 110 supports the media sharing session, and in response the user terminal 110 sends a reply to the user terminal 102 which may indicate that the user terminal 110 does support the media sharing session. Included in the reply is an indication of the requirements of the user terminal 110 for receiving media data in the media sharing session. For example, the report may indicate: (i) a particular format (e.g. JPEG for image data) with which it can receive media data, and/or (ii) a memory constraint of the user terminal 110 for media data relating to a media sharing session. In this way, the user terminal 102 is able to determine how to convert media data (e.g. which format to use and whether to down-scale the media data) for transmission to the user terminal 110 in the media sharing session. This allows the implementations of the clients of the media sharing session (e.g. at the user terminal 110) to be simplified, in that they are only required to support one particular format (e.g. JPEG format) and they can indicate to other user terminals that media data should be converted to that particular format for transmission to the user terminal 110 in a media sharing session. Transfer times for media data in media sharing sessions may also be improved because the amount of media data transferred in the media sharing session may be reduced as a result of down-scaling of the media data.

The user terminal 102 may use a smart re-sizing algorithm for down-scaling the media data for transmission in the media sharing session. For example, when the media data is image data, the user terminal 102 may select a resolution less than or equal to the original image (no up-scaling) as well as targeting a maximum High Definition (HD) friendly resolution (e.g. 480 pixels high may be used as a default) dependent upon the reported memory constraints of the user terminal 110. In some embodiments, the user 104 of the user terminal 102 may have the option to change the maximum scaling of the media data communicated in the media sharing session. This may be done via the user interface of the user terminal 102.

Either participant in the media sharing session may end the media sharing session. In order to end the media sharing session the user 104 can select a 'media sharing session end' button, e.g. in the user interface displayed at the user terminal 102. In one example, the 'media sharing session end' button may be implemented as a dedicated button on a remote control associated with the user terminal 102, where for example the user terminal 102 may be a television. Similarly, the user 112 may end the media sharing session by selecting a 'media sharing session end' button. When a 'media sharing session end' button is selected then a message will be sent to the other participant(s) of the media sharing session to inform them that the media sharing session is to be ended, and then the media sharing session ends. The user interfaces at each of the user terminals involved in the media sharing session may return to the last user interface state that was displayed prior to the establishment of the media sharing session. For example, if the media sharing session is established during a video call and a dedicated section of the user interface for the video call is used for the media sharing session then when the media sharing session ends that dedicated section may be removed from the user interface for the video call, thereby allowing the video call to use that part of the user interface again.

In one or more embodiments described herein the media data comprises photos which are sent from the user terminal 102 to the user terminal 110 in the media sharing session. However, it will be appreciated that in other embodiments the media data may comprise other types of data, such as audio data (e.g. music data), video data or text data, and features described herein relating to the embodiments in which the media data comprises photos could also be implemented in embodiments in which the media data is another type of data. Where the media data is photo data, the media sharing sessions may be referred to herein as PhotoShare sessions and the protocol used to communicate the photo data in a PhotoShare session may be referred to as a PhotoShare protocol.

PhotoShare sessions allow for photo sharing during calls (e.g. video or audio calls) between the users 104 and 110 of the communication system 100. In one or more embodiments, the PhotoShare protocol is designed to be a forward looking protocol, allowing for additional features to be included subsequently without providing additional parsers for backward protocol support.

The photos which are displayed at the user terminal 110 (the PhotoShare client) during the PhotoShare session may be displayed in a particular section of the user interface at the user terminal 110. The section of the user interface may be reserved for displaying photos of the PhotoShare session when the PhotoShare session is established. This is a simple process when the user terminals 102 and 110 are already engaged in a video call when the PhotoShare session is established. In this case, the video call already has a user interface being displayed to the user 112 and it is a simple process to use a section, or "region", of that user interface to display the photos received during the PhotoShare session. For example, when the PhotoShare session is established, the user terminal 110 may initialize a PhotoShare Layout which reserves a region of the display of the user terminal 110 for photos received in the PhotoShare session. The user terminal 102 (PhotoShare host) may activate its own PhotoShare Layout to reserve a region of the display of the user terminal 102 for the PhotoShare session in response to receiving confirmation from the user terminal 110 that the PhotoShare session is to be established. The PhotoShare Layouts at both user terminals 102 and 110 are dedicated to showing the photo data of the PhotoShare session. The user 104 of the user terminal 102 can select photos (or other images) from the dedicated region of the display 204 at the user terminal 102 in order to transfer the selected photos to the user terminal 110 during the PhotoShare session. Similarly, the photos (or other images) received at the user terminal 110 in the PhotoShare session are displayed in the dedicated region of the display at the user terminal 110.

The user terminal 110 may choose to display EXIF data from the JPEG format relating to the photo data to the user 112, so the user terminal 102 should maintain that data during conversions of the original image to suit the requirements of the user terminal 110 in the PhotoSharing session.

Figure 4:
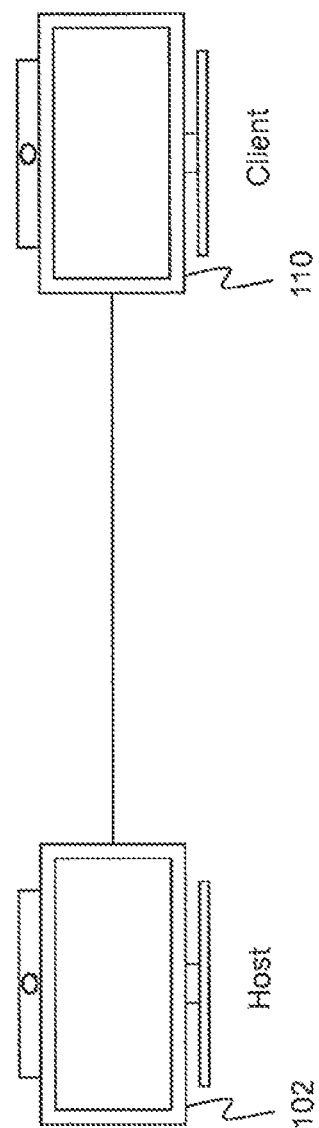
FIG. 4 shows a first example communication system.

FIG. 4 shows an example of the user terminals 102 and 110 arranged for a media sharing session whereby the user terminal 102 is the host of the media sharing session and the user terminal 110 is the client of the media sharing session. The connection between the user terminals 102 and 110 shown in FIG. 4 is implemented over the communication system 100, that is, over the network 108. As described above, media data can be transferred from the user terminal 102 to the user terminal 110 in the media sharing session for output at the user terminal 110. In the example shown in FIG. 4 the user terminal 102 is a television. Before the media data is transferred to the user terminal 110 in the media sharing session the user 104 uploads the media data to the memory 226 of the television 102. Then when the call is implemented with the user terminal 110, the user 104 can establish the media sharing session with the user terminal 110 and then select media data files from the memory 226 of the television 102 for transmission to the user terminal 110 in the media sharing session.

Figure 5:
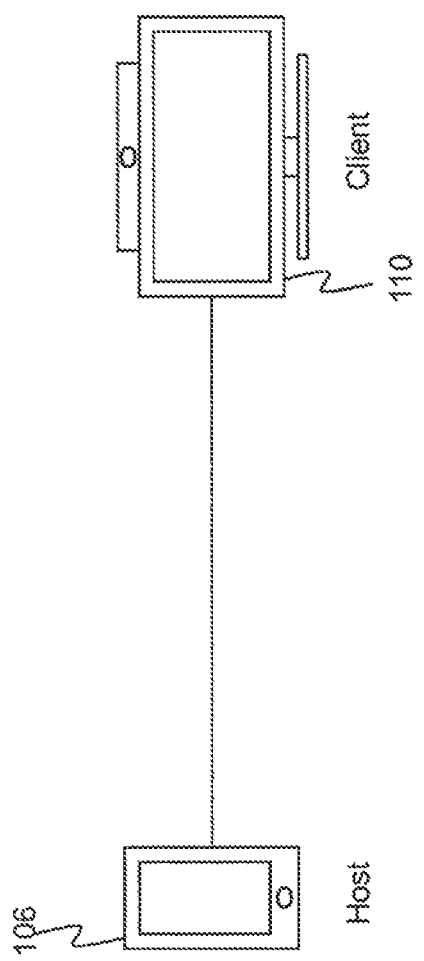
FIG. 5 shows a second example communication system.

FIG. 5 shows an example of the user terminals 102 and 110 arranged for a media sharing session similar to that of FIG. 4 whereby the user terminal 102 is the host of the media sharing session and the user terminal 110 is the client of the media sharing session. In the example shown in FIG. 5 the user terminal 102 is a mobile phone which stores media data in its memory 226. When the call is implemented with the user terminal 110, the user 104 can establish the media sharing session with the user terminal 110 and then select media data files from the memory 226 of the mobile phone 102 for transmission to the user terminal 110 in the media sharing session.

In the methods described above the user terminal 102 is the host of the media sharing session and the user terminal 110 is the client of the media sharing session. However, each user terminal in the communication system 100 may have the ability to act as either host or client in a media sharing session, and as such, in other embodiments the user terminal 110 is the host of the media sharing session and the user terminal 102 is the client of the media sharing session.

The methods described above relate to sharing media data between different users over a communication system 100. In the examples described above the user 104 uses the user terminal 102 to share media data with the user 112 at user terminal 110. Similar principles for communicating media data can be used to communicate media data between two user terminals of the same user. In this case the media data is not shared between users but is communicated between user terminals of the same user.

For example, the user 104 is associated with the user terminals 102 and 106. A communication instance for the user 104 can be implemented at each of user terminals 102 and 106 to allow the user 104 to log into the communication system 100 using either, or both, of user terminals 102 and 106. When the user 104 is logged into the communication system 100 via multiple communication instances (e.g. at user terminals 102 and 106) then a media communication session can be established between the communication instances and used to transfer media data (e.g. images, video, audio, etc.) between the communication instances.

Figure 6:
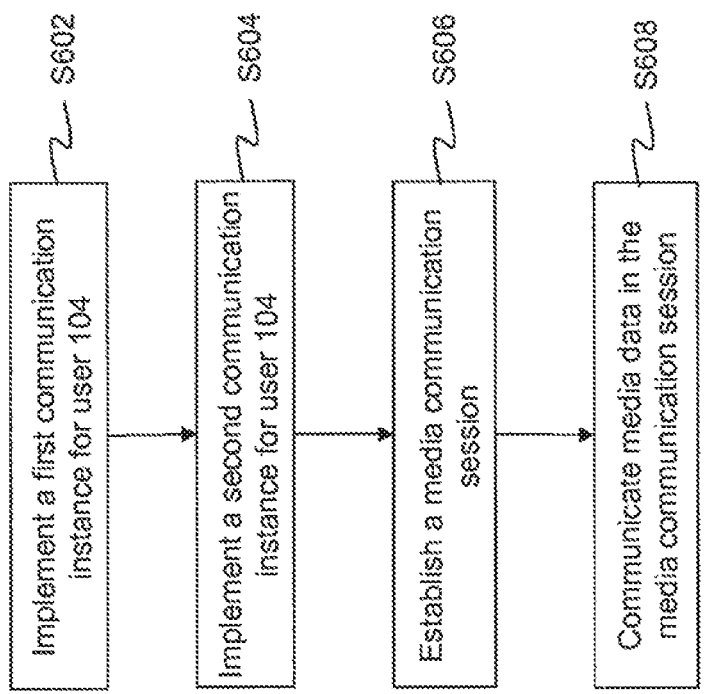
FIG. 6 is a flow chart for a second process of communicating media data according to an embodiment.

With reference to the flow chart shown in FIG. 6 there is now described a method of communicating media data between user terminals 102 and 106 over the communication system 100.

In step S602 a first communication instance for the user 104 is implemented at the user terminal 106. As described above, the user 104 logs into the communication system 100 via the first communication instance at the user terminal 106. The user 104 has a user ID in the communication system 100 which allows the user 104 to be identified in the communication system 100. In particular, the user ID of the user 104 can be used to authenticate communications to and from the user 104 via the first communication instance at the user terminal 106 over the communication system 100.

In step S604 a second communication instance for the user 104 is implemented at the user terminal 102. The user 104 also logs into the communication system 100 via the second communication instance at the user terminal 102. The same user ID is used to identify the user 104 in the communication system 100 by both the first communication instance at the user terminal 106 and the second communication instance at the user terminal 102. The user ID of the user 104 can be used to authenticate communications to and from the user 104 via the second communication instance at the user terminal 102 over the communication system 100. The communication instances are implemented using communication client software such as that provided by the client stack 216 executed on the CPU 202 of the user terminal 102. A similar client stack is executed on a CPU of the user terminal 106.

In this way, the user 104 is simultaneously logged into the communication system 100 via both the first and second communication instances at the respective user terminals 106 and 102.

Figure 3:
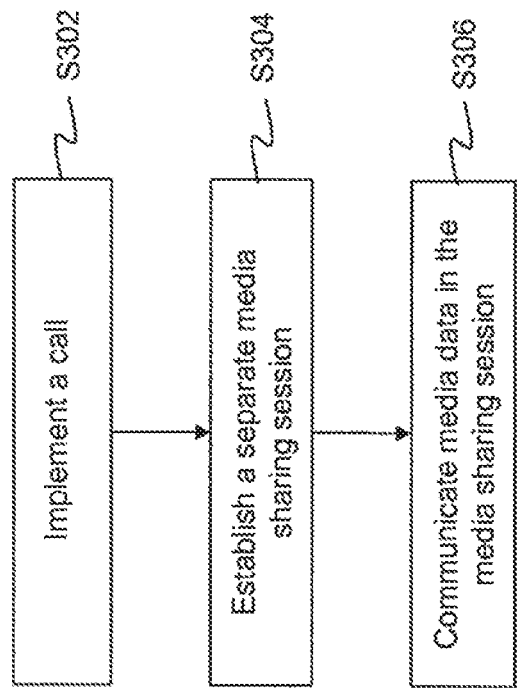
FIG. 3 is a flow chart for a first process of communicating media data according to an embodiment.

In step S606 the user 104 establishes a media communication session between the communication instances on the user terminals 106 and 102. The media communication session is similar to the media sharing session described above in relation to the method of FIG. 3, except that the media communication session is established between user terminals (106 and 102) which are both associated with the same user (user 104), whereas the media sharing sessions described above are established between user terminals (102 and 110) which are associated with different users (104 and 112). It can be appreciated that the media communication session allows for self-to-self communication of media data over the communication system 100. In particular the media communication session allows communication of media data between user terminals (106 and 102) which are both logged into the communication system 100 using the same user ID. Similarly to with the media sharing sessions described above the user terminal 106 may send a query to the user terminal 102 prior to the establishment of the media communication session to determine whether the user terminal 102 supports media communication sessions. The query may be sent at any time prior to the establishment of the media communication session, for example in response to a user input from the user 104 at the user terminal 106, or in response to the user 104 indicating that he wishes to establish a media communication session with the user terminal 102, or in response to the user 104 logging into the communication system 100 on the user terminal 106 or the user terminal 102.

The media communication session is authenticated on the basis of the same user (that is, user 104) being simultaneously logged into the communication system via both the first and second communication instances on the respective user terminals 106 and 102. Since the same user is logged into the communication system 100 at both user terminals 106 and 102 it can be assumed that the user 104 has trust in himself to thereby allow the communication of media data between the user terminals 106 and 102.

Once the media communication session has been established, then in step S608 media data is communicated from the user terminal 106 to the user terminal 102 in the media communication session. The media data is communicated according to a media communication protocol of the media communication session (which may be the same as the media sharing protocol described above). The communicated media data may then be output to the user 104 via the user interface of the user terminal 102. For example, where the media data comprises images, the images are displayed to the user 104 on the display of the user terminal 102. The communicated media data may be output automatically at the user terminal 102 when it is received from the user terminal 106 in the media communication session.

The media data is communicated in the media communication session over the communication system 100 (similarly to the communication of media data in the media sharing sessions described above). Both the user terminals 106 and 102 of the media communication session may be located in the proximity of the user 104 so that the user 104 can control both user terminals 106 and 102 in the media communication session. Alternatively, the user terminals 106 and 102 may not be located closely to each other such that the user 104 may be in the proximity of only one of the user terminals 106 and 102.

The method described above in relation to FIG. 6 provides the ability for the user 104 to transfer media data (such as image data, video data, audio data, text data, etc.) between instances of the user's account which are logged into the communication system 100 on different user terminals.

This can be particularly useful when the user 104 has more than one user terminal (e.g. user terminals 106 and 102) which are capable of communicating over the communication system 100 and where media data is stored at only one of those user terminals (e.g. at user terminal 106) and where the user 104 wishes to output the media data using a different one of his user terminals (e.g. user terminal 102). The user may wish to output the media data at the different one of his user terminals (e.g. user terminal 102) because it may be more convenient or because the output means of the user terminal 102 may be of a higher standard than those of the user terminal 106. For example, the user terminal 106 may be a mobile phone or tablet at which media data is stored and the user terminal 102 may be a television. The display and speakers of a television are typically of a higher standard than those of a mobile phone or tablet. Therefore, where the media data comprises audio and/or visual data the user 104 may wish to output the media data using the television rather than the mobile phone or tablet. It is also noted that in this example, the memory capabilities of the television may be less than the memory capabilities of the mobile phone or tablet which may be a reason for the user 104 storing the media data at the mobile phone or tablet rather than at the television. This is one example in which the media communication sessions described with reference to FIG. 6 are particularly useful.

The methods described above with reference to FIG. 6 enable media data to be output from a remote user terminal (that is, remote from where it is stored) in a controlled manner. The user 104 controls the media data that is to be output on the remote user terminal.

In one or more embodiments, the user terminal 106 is a portable device such as a laptop, phone or tablet, which has good memory capabilities for storing media data. When the user terminal 106 is portable, the user can carry the user terminal 106 to where the user terminal 106 is needed. However, when the user terminal 106 is portable it will typically not have a very large screen for outputting image data, and may also not have very high quality speakers for outputting audio data. Furthermore, in one or more embodiments the user terminal 102 is a non-portable device such as a television, a BluRay player, a set top box or a games console, which may not have such good memory capabilities for the user 104 to store media data, but may be associated with a large screen for outputting image data and high quality speakers for outputting audio data, e.g. at a television.

Corresponding features of the way in which media data is communicated in the media sharing sessions between the user terminals 106 and 102 described above also apply to the way in which media data is communicated in the media communication sessions between the user terminals 106 and 102.

For example, the media data may be transmitted from the user terminal 106 to the user terminal 102 in the media communication session in data packets over the network 108. The data packets are formed according to the protocol of the media communication session. Each data packet may include a portion of media data wherein the user terminal 102 receives multiple data packets and combines the data from those data packets in order to output the media data in the media communication session. For example, each data packet may comprise a set amount of data, e.g. 16 KB or 64 KB. In one example, the raw data is Base64 encoded. The data transfer size of the data packets may be included as a prefix to the data itself in the data packet. The data transfer size shall be that of the post-Base64 converted data, not the original data itself. Preferably, the media data of the media communication session is communicated using application-to-application (app2app) streams, which is more reliable than sending the data using datagrams.

Some of the messaging between the user terminals 106 and 102, (e.g. which is used to signal the start and end of the media communication session and is used to send queries and replies regarding the ability of the user terminal 102 to support the media communication sessions, etc.) may be sent in packets which have a different amount of data compared to the data packets. These packets can be much smaller than the data packets and may, for example, have 64 bytes. These packets also adhere to the protocol of the media communication session.

During the media communication session the user interface at the user terminal 106 provides the ability for the user 104 to browse media data, such as photos (which may be stored in the memory of the user terminal 106), and on demand, send some or all of the media data to the user terminal 102 in the media communication session, provided the user terminal 102 supports the media communication sessions.

The user terminal 106 is the host of the media communication session and the user terminal 102 is the client of the media communication session in the example described above. The user terminal 106 is in charge of the media communication session and can control which pieces of media data are communicated to the user terminal 102 during the media communication session. In contrast, the user terminal 102 outputs the media data (e.g. displays photos) that are communicated as and when they are received from the user terminal 106 in the media communication session. In particular, the user terminal 102 may not be able to control which pieces of media data (e.g. photos) are viewed during the media communication session.

Some minor restrictions may be placed on implementations of the media communication sessions, for interoperability as well as for data security. For example in one or more embodiments, media data transferred to the user terminal 102 in the media communication session may not be stored to disk (i.e. memory) at the user terminal 102. The user terminal 106 (i.e. the host of the media communication session) may control the output of the media data at the user terminal 102, and can control it such that only one piece of media data (e.g. one file of the media data) at a time may be output at the user terminal 102, wherein the user terminal 106 controls which piece of media data is viewed at the user terminal 102 in the media communication session. By not storing the media data which is communicated in the media sharing session at the user terminal 102 the overhead on implementations can be reduced in terms of storage and memory at the user terminal 102. Since the media data which is communicated in the media communication session is not permanently stored at the user terminal 102 (e.g. none of the media data may be stored at the user terminal 102 after the media sharing session ends), the user terminal 106 is not required to distribute the full files of media data (e.g. photo files) to the user terminal 102 in order to display the media data at the user terminal 102. As described above, the communicated media data may comprise a plurality of files and in some embodiments no more than one of the files is stored at the user terminal 102 in the media communication session at a time. For example, when one of the files is stored at the user terminal 102 in the media communication session, then the receipt of the next file in the media communication session causes the file currently stored at the user terminal 102 to be deleted from the user terminal 102 so that the newly received file can be stored at the user terminal 102 without storing more than one of the files at a time at the user terminal 102 in the media communication session. Furthermore, the communicated media data may be stored in a data store at the user terminal 102 which is dedicated for storing data of the media communication session and which is distinct from the main memory of the user terminal 102.

In order to select media data files to transfer to the user terminal 102 in the media communication session, the user 104 may select the media data files from a film strip view at the user terminal 106 as described above in relation to the selection of media data in the media sharing sessions.

Similarly to as described above in relation to the media sharing sessions, the host of the media communication session, i.e. user terminal 106, is a "smart" host in the sense that it has the ability to convert the format of the media data to suit the media communication session. For example, the format of the media data may be converted to suit capabilities of the client of the media communication session client (user terminal 102). The conversion of the media data may comprise down-scaling and/or compression such that the size of the media data (e.g. the number of bits of the media data) is reduced (e.g. by reducing the resolution of an image) to suit the requirements of the user terminal 102, and the format of the media data may be converted to a format which is supported by the user terminal 102 (e.g. the JPEG format could be used for image data). As described above in relation to the media sharing sessions, the requirements of the user terminal 102 may be indicated to the user terminal 106 in the response to the query as to whether the user terminal 102 supports media communication sessions.

Similarly to as described above in relation to the media communication sessions, either participant in the media communication session may end the media communication session.

The media communication methods described herein allow the user 104 to transfer media data from the user terminal 106 to the user terminal 102 for output at the user terminal 102. Both user terminals 106 and 102 may be connected to the network 108 (e.g. the internet) and so it is a simple process to communicate the media data over the network 108 in the media communication sessions. This is in contrast to trying to implement some other connection, e.g. a USB connection between the user terminals 106 and 102, for which the user 104 would be required to establish the connection prior to transferring the media data between the user terminals 106 and 102. The media communication sessions make use of the user terminals 106 and 102 already being connected to the network 108 for transferring media data between the user terminals 106 and 102 so that the user 104 is not required to establish another separate connection between the user terminals 106 and 102 before the media data can be transferred.

In one or more embodiments described herein the media data comprises photos which are sent from the user terminal 106 to the user terminal 102 in the media communication session. However, it will be appreciated that in other embodiments the media data may comprise other types of data, such as audio data (e.g. music data), video data or text data, and features described herein relating to the embodiments in which the media data comprises photos could also be implemented in embodiments in which the media data is another type of data. Where the media data is photo data, the media communication sessions may be referred to herein as PhotoRemote sessions and the protocol used to communicate the photo data in a PhotoRemote session may be referred to as a PhotoRemote protocol.

PhotoRemote sessions allow for the transfer of photos between multiple instances of a user logged into the communication system 100.

The photos which are displayed at the user terminal 102 (the PhotoRemote client) during the PhotoRemote session may be displayed in a particular section of the user interface at the user terminal 102. The section of the user interface may be reserved for displaying photos of the PhotoRemote session when the PhotoRemote session is established. For example, when the PhotoRemote session is established, the user terminal 102 may initialize a PhotoRemote Layout which reserves a region of the display of the user terminal 102 for photos received in the PhotoRemote session. The user terminal 106 (PhotoRemote host) may activate its own PhotoRemote Layout to reserve a region of the display of the user terminal 106 for the PhotoRemote session in response to receiving confirmation from the user terminal 102 that the PhotoRemote session is to be established. The PhotoRemote Layouts at both user terminals 106 and 102 are dedicated to showing the photo data of the PhotoRemote session. The user 104 of the user terminal 106 can select photos (or other images) from the dedicated region of the display at the user terminal 106 in order to transfer the selected photos to the user terminal 102 during the PhotoRemote session. Similarly, the photos (or other images) received at the user terminal 102 in the PhotoRemote session are displayed in the dedicated region of the display at the user terminal 102.

Figure 7:
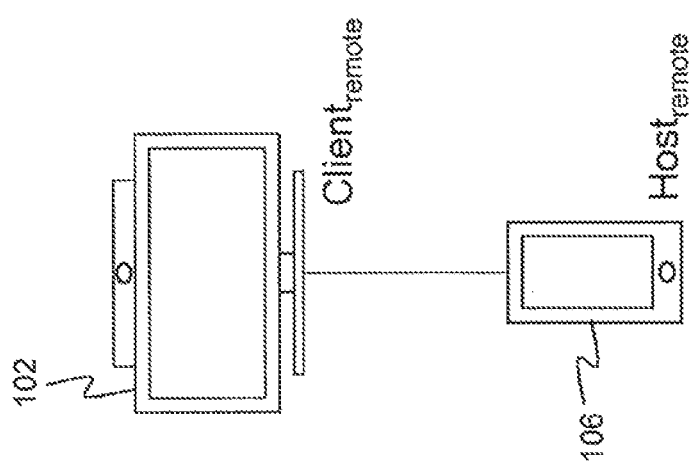
FIG. 7 shows a third example communication system.

FIG. 7 shows an example of the user terminals 106 and 102 arranged for a media communication session whereby the user terminal 106 is the host of the media communication session and the user terminal 102 is the client of the media communication session. The connection between the user terminals 106 and 102 shown in FIG. 7 is implemented over the communication system 100, that is, over the network 108. As described above, media data can be transferred from the user terminal 106 to the user terminal 102 in the media communication session for output at the user terminal 102.

In the methods described above the user terminal 106 is the host of the media communication session and the user terminal 102 is the client of the media communication session. However, each user terminal in the communication system 100 may have the ability to act as either host or client in a media communication session, and as such, in other embodiments the user terminal 102 is the host of the media communication session and the user terminal 106 is the client of the media communication session. The client of the media communication session could be one of a television, a Blue-Ray player, a set top box, a games console, a speaker and a digital picture frame configured to output media data received from the host of the media communication session.

The two methods, that is: (i) the media sharing method (e.g. the PhotoShare method) and (ii) the media communication method (e.g. the PhotoRemote method) may be used serially and consecutively during a call.

For example, the user 104 may be using the user terminal 102 in a call with the user 112 at user terminal 110. The user 104 may then decide to share some media data which is stored at the user terminal 106 with the user 112. The user 104 can establish a media communication session between the user terminals 106 and 102 (authenticated on the basis that the user terminals 106 and 102 are both logged into the communication system using the same user ID—the user ID of user 104) and also establish a media sharing session between the user terminals 102 and 110 (authenticated on the basis that the user terminals 102 and 110 are implementing a call over the communication system when the media sharing session is initiated). In this way media data can be transmitted from the user terminal 106 to the user terminal 110 via the user terminal 102, i.e. via the media communication session between user terminals 106 and 102 and the media sharing session between user terminals 102 and 110.

Figure 8:
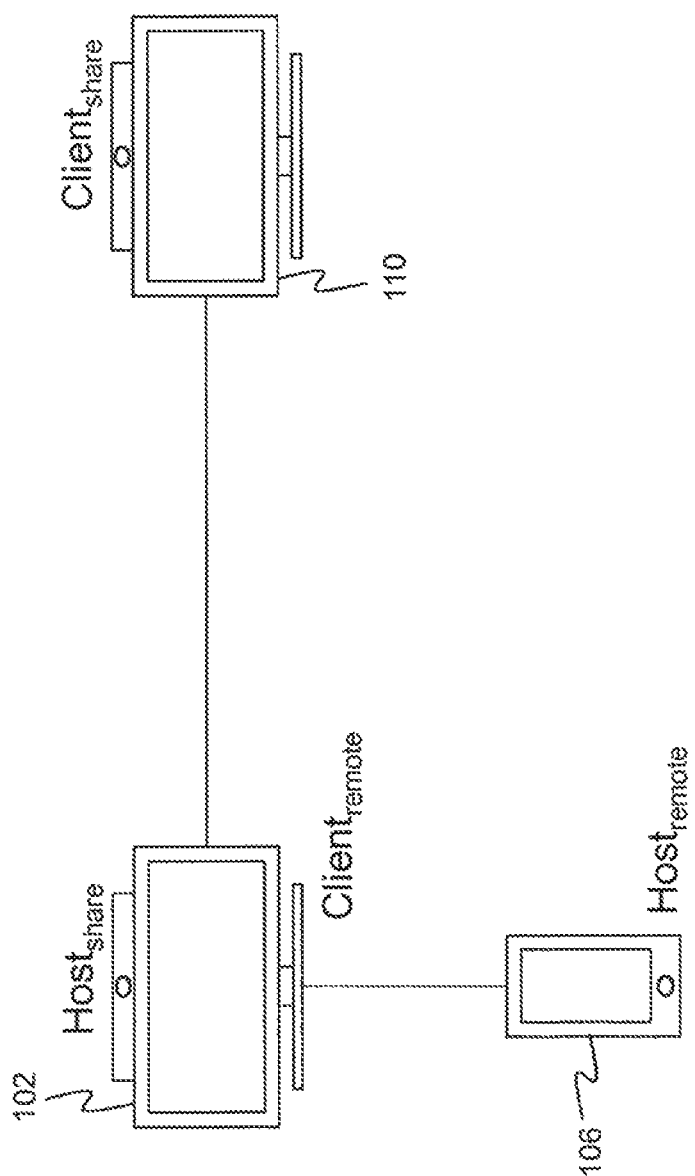
FIG. 8 shows a fourth example communication system.

FIG. 8 shows an example of a PhotoRemote session being implemented between user terminals 106 and 102 and a PhotoSharing session being implemented between user terminals 102 and 110. As indicated in FIG. 8, the user terminal 106 is the host of the PhotoRemote session whilst the user terminal 102 is the client of the PhotoRemote session, and the user terminal 102 is the host of the PhotoShare session whilst the user terminal 110 is the client of the PhotoShare session. The arrangement in FIG. 8 allows photos to be transmitted from the user terminal 106 to the user terminal 110 via the user terminal 102 as described above.

In the methods described above, there may be more user terminals in the communication system 100 than those shown in FIG. 1. The media sharing sessions described with reference to FIG. 3 may include one or more media sharing clients to which media data is communicated. Similarly, the media communication sessions described with reference to FIG. 6 may include one or more media communication clients to which media data is communicated.

The methods described above may be implemented by means of computer program products executed at the user terminals for performing the method steps described herein. For example, the method steps may be implemented by the client stacks (e.g. 216) implemented at the user terminals.

Generally, any of the functions described herein can be implemented using software, firmware, hardware (e.g., fixed logic circuitry), or a combination of these implementations. The terms "module," "functionality," "component" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, a computer-readable medium may be configured to maintain instructions that cause a computing device, and more particularly the operating system and associated hardware to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may us magnetic, optical, and other techniques to store instructions and other data.

Any type of media data may be communicated in the methods described above, such as image data, photo data, video data, audio data, music data or text data, and any suitable format may be used such as JPEG, BMP, BM PNG, MPEG, MP3, PDF, etc.

Furthermore, while the various embodiments have been particularly shown and described, it will be understood to those skilled in the art that various changes in form and detail may be made without departing from the scope of the claimed subject matter.

What is claimed is:

1. A method of communicating media over a communication system, the method comprising:
    receiving, at a first computing device, media data from a second computing device during a media communication session between a first communication application executing on the first computing device and a second communication application executing on the second computing device, wherein a same authorized account is authenticated on both the first and second communication applications;
    wherein the first and second communication applications are configured to allow selectively establishing a communications call during a call communication session, and the first and second communication applications configured to utilize a different communication protocol to transfer the media data than what the first and second communication applications are configured to utilize for a communications call;
    at the first computing device, outputting the media data upon receipt by the first computing device of the media data, the media data being converted to a format that corresponds to capabilities of the first computing device, the output controlled by the second computing device; and
    wherein the media data is removed from a memory at the first computing device after the media communication session has ended.

2. The method of claim 1, comprising:
    setting up a communications call between the first computing device and a third computing device, the communications call comprising a real-time exchange of audio between the first computing device and the third computing device.

3. The method of claim 2, wherein the media data is sent from the second computing device to the third computing device via the first computing device.

4. The method of claim 2, wherein outputting the media data comprises outputting the media data in a section of a user interface separate from media received as part of a communications call.

5. The method of claim 2, wherein the communications call includes the second computing device.

6. The method of claim 1, wherein the media data is converted by the second computing on the second computing device prior to transmission.

7. The method of claim 1, wherein the first and second computing devices authenticate into the media communication session based on the same authorized account being associated with a communication system on both the first and second communication applications.

8. A system for communicating media over a communication system, the system comprising:
    a first computing device comprising a processor and a memory, the memory storing instructions, which when executed by the processor, cause the processor to perform operations comprising:
    receiving media data from a second computing device during a media communication session between a first communication application executing on the first computing device and a second communication application executing on the second computing device, wherein a same authorized account is authenticated on both the first and second communication applications;
    wherein the first and second communication applications are configured to allow selectively establishing a communications call during a call communication session, and the first and second communication applications configured to utilize a different communication protocol to transfer the media data than what the first and second communication applications are configured to utilize for a communications call;
    outputting the media data upon receipt by the first computing device of the media data, the media data being converted to a format that corresponds to capabilities of the first computing device, the output controlled by the second computing device; and
    wherein the media data is removed from a memory at the first computing device after the media communication session has ended.

9. The system of claim 8, wherein the operations further comprise:
    setting up a communications call between the first computing device and a third computing device, the communications call comprising a real-time exchange of audio between the first computing device and the third computing device.

10. The system of claim 9, wherein the media data is sent from the second computing device to the third computing device via the first computing device.

11. The system of claim 9, wherein the operations of outputting the media data comprises outputting the media data in a section of a user interface separate from media received as part of a communications call.

12. The system of claim 9, wherein the communications call includes the second computing device.

13. The system of claim 8, wherein the media data is converted by the second computing on the second computing device prior to transmission.

14. The system of claim 8, wherein the first and second computing devices authenticate into the media communication session based on the same authorized account being associated with a communication system on both the first and second communication applications.

15. A device comprising:
    means for receiving, at a first computing device, media data from a second computing device during a media communication session between a first communication application executing on the first computing device and a second communication application executing on the second computing device, wherein a same authorized account is authenticated on both the first and second communication applications;
    wherein the first and second communication applications are configured to allow selectively establishing a communications call during a call communication session, and the first and second communication applications configured to utilize a different communication protocol to transfer the media data than what the first and second communication applications are configured to utilize for a communications call;
    means for outputting the media data upon receipt by the first computing device of the media data, the media data being converted to a format that corresponds to capabilities of the first computing device, the output controlled by the second computing device; and
    means for removing the media data from a memory at the first computing device after the media communication session has ended.

16. The device of claim 15, further comprising:
    means for setting up a communications call between the first computing device and a third computing device, the communications call comprising a real-time exchange of audio between the first computing device and the third computing device.

17. The device of claim 16, wherein the media data is sent from the second computing device to the third computing device via the first computing device.

18. The device of claim 16, wherein the means for outputting the media data comprises means for outputting the media data in a section of a user interface separate from media received as part of a communications call.

19. The device of claim 16, wherein the communications call includes the second computing device.

20. The device of claim 15, wherein the media data is converted by the second computing on the second computing device prior to transmission.

* * * * *